United States Patent
Raju et al.

(10) Patent No.: US 9,996,381 B1
(45) Date of Patent: Jun. 12, 2018

(54) LIVE APPLICATION MANAGEMENT WORKFLOW USING METADATA CAPTURE

(71) Applicant: Amazon Technologies, Inc., Seattle, WA (US)

(72) Inventors: Gurinder Raju, Seattle, WA (US); Karmveer Veer Singh, Redmond, WA (US); Abhinav Shrivastava, Seattle, WA (US); Sheshadri Supreeth Koushik, Redmond, WA (US); Deepak Suryanarayanan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/084,296

(22) Filed: Mar. 29, 2016

(51) Int. Cl.
*G06F 9/455* (2018.01)
*G06F 9/445* (2018.01)

(52) U.S. Cl.
CPC ............ *G06F 9/45558* (2013.01); *G06F 8/65* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 8,683,464 B2 * | 3/2014 | Rozee | ...................... | G06F 8/61 718/1 |
| 8,683,560 B1 * | 3/2014 | Brooker | .................. | H04L 63/08 713/155 |
| 8,863,255 B2 * | 10/2014 | Zarfoss, III | ............. | H04L 63/08 713/155 |
| 9,002,982 B2 * | 4/2015 | Suryanarayanan | . | H04L 67/1097 709/217 |
| 9,110,732 B1 * | 8/2015 | Forschmiedt | ....... | G06F 9/44505 |
| 9,256,452 B1 * | 2/2016 | Suryanarayanan | ..... | G06F 9/455 |
| 9,325,844 B2 * | 4/2016 | Ristock | ............... | H04M 3/5175 |
| 9,436,493 B1 * | 9/2016 | Thomas | .................. | G06F 21/53 |
| 9,471,590 B2 * | 10/2016 | Venkatesh | .......... | G06F 17/30174 |
| 9,626,700 B1 * | 4/2017 | Thimsen | ................ | G06Q 30/06 |
| 9,766,912 B1 * | 9/2017 | Jorgensen | ........... | G06F 9/45533 |
| 2013/0086585 A1 * | 4/2013 | Huang | .................. | G06F 9/5072 718/1 |

(Continued)

OTHER PUBLICATIONS

Sadjadi et al. "A Self-Configuring Communication Virtual Machine", 2008 IEEE, pp. 739-744.*

(Continued)

*Primary Examiner* — Van H Nguyen
(74) *Attorney, Agent, or Firm* — Davis Wright Tremaine LLP

(57) ABSTRACT

Techniques for configuring virtual machine instances are described herein. A virtual machine instance is instantiated and the virtual machine instance is monitored to receive notifications of configuration events associated with that virtual machine instance. Each configuration event, which specifies configuration changes to the virtual machine instance, includes a set of metadata associated with the configuration event. The metadata is extracted from the configuration event and the configuration changes are applied to the virtual machine instance. A new virtual machine image is then produced from the virtual machine instance and the extracted metadata is associated with the new virtual machine image.

20 Claims, 10 Drawing Sheets

(56) References Cited

U.S. PATENT DOCUMENTS

2014/0129698 A1* 5/2014 Seago ................... G06F 9/542
                                                        709/224
2016/0162312 A1* 6/2016 Doherty ................ G06F 11/30
                                                        718/1

OTHER PUBLICATIONS

Chen et al. "An Architecture for Dynamic Management and Monitoring of Virtual Machines", 2012 IEEE, pp. 444-448.*

* cited by examiner

LIVE APPLICATION MANAGEMENT WORKFLOW USING METADATA CAPTURE

BACKGROUND

Modern computer systems are frequently implemented as virtual computer systems operating collectively on one or more host computer systems. These virtual computer systems may utilize resources of host computer systems such as processors, memory, network interfaces, storage services, and other host computer system resources. These virtual computer systems may also include software applications configured to operate on the virtual computer systems, which may utilize these resources to perform functionality on behalf of users of the virtual computer systems. If the resources associated with a virtual computer are not matched to the software application needs, a degraded user experience may result. When the resources are inadequate for the software application needs, reduced system performance and/or increased system outages may result. When the resources are underutilized, needed system resources may be unnecessarily consumed by idle processes.

One approach to the problem of configuring a virtual machine instance to support a suite of software applications is to configure the virtual machine and deploy instances of that configuration to users. However, in the case of a large or complex virtual computer system with many instances of a particular virtual machine configuration, the process of configuring, testing, and updating a particular configuration can take a significant amount of time. Additionally, the loss of available virtual machine instances during this configuration process and the expense of maintaining idle host computer systems during this configuration process may further degrade the user experience.

BRIEF DESCRIPTION OF THE DRAWINGS

Various techniques will be described with reference to the drawings, in which.

DETAILED DESCRIPTION

Figure 1:
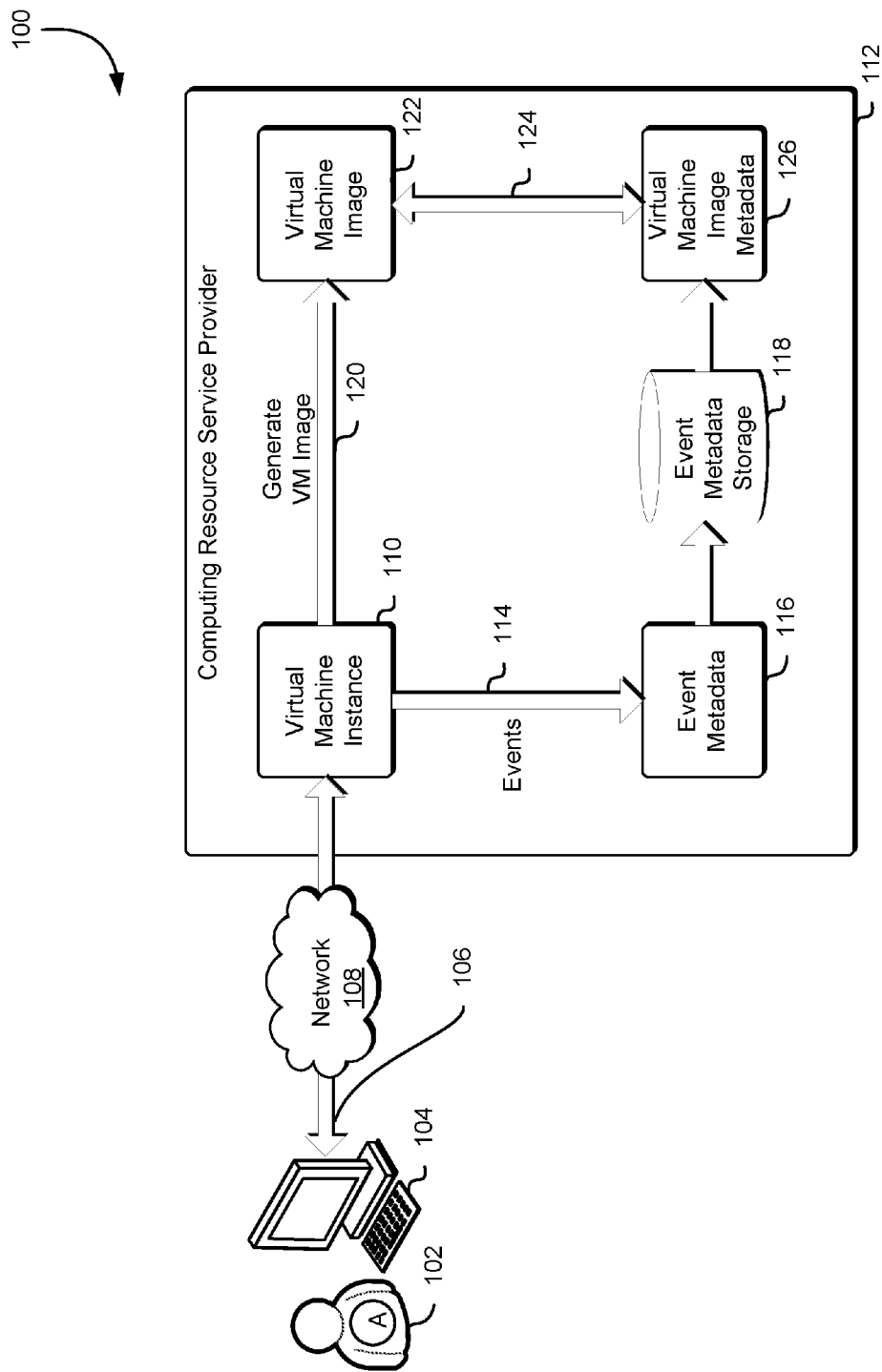
FIG. 1 illustrates an example environment where a virtual machine instance is configured.

This disclosure relates to methods for configuring virtual machine instances with software applications and providing access to those virtual machine instances to users so that the users may interact with those software applications. Access to software applications hosted on a virtual machine instance may be provided to users by sending the display contents to a computing device of the user. Interaction with those software applications is provided to users by sending keystrokes and/or mouse movements from the computing device of the user to the virtual machine instance. For example, the display of the virtual machine instance may be streamed to the display of a computing device associated with the user over a network and notification of input events such as keyboard events and mouse events may also be streamed from the computing device of the user to the virtual machine instance over the network. In one example, the virtual machine instance streams the display of the virtual machine instance to a dedicated streaming client running on the computing device associated with the user. In another example, the virtual machine instance streams the display of the virtual machine instance to a general purpose display application such as a web browser. A streaming agent running on the virtual machine instance encodes display information provided by the hosted software applications, and transmits the encoded display information to a computing system associated with the user. The user is able to interact with the virtual machine instance via the client computer system.

Configuring a virtual machine instance to host software applications involves selecting a virtual machine instance that is hosted on a host computer system with adequate resources for those particular software applications. For example, a software application (also referred to herein simply as an "application") that requires a particular amount of memory to function smoothly is generally be installed on a virtual machine instance hosted on a host computer system with at least that amount of physical memory to avoid swapping delays (i.e., delays in processing while the memory contents of the virtual machine are swapped to and from storage). Similarly, an application that requires access to data storage is generally be installed on a virtual machine instance hosted on a host computer system configured to provide that data storage.

In the examples described below, a virtual machine instance is configured to support a set of software applications dynamically by instantiating a virtual machine instance and configuring that virtual machine instance with the software applications requested. A virtual machine instance type may be selected such that the virtual machine instance can support the set of requested software applications. The selected virtual machine instance may then be instantiated from the virtual machine instance type. In an example, the virtual machine instance is instantiated from a basic virtual machine instance with only a minimal set of software applications installed. In such an example, the virtual machine instance may be generated from a fresh install of an operating system and may only have capabilities required to install additional software applications. The virtual machine instance may also be instantiated from a virtual machine instance type selected from a virtual machine image catalog containing one or more different virtual machine instance types with a larger and/or more complex suite of preinstalled software applications such as, for example, a suite of typical office applications (e.g., a word processing application, a spreadsheet application, and a presentation application). The virtual machine instance may also be instantiated from a virtual machine image generated from a previously configured virtual machine instance. In this example, a running virtual machine instance can be saved as a virtual machine image and that virtual machine image may then be used as the basis for additional virtual machine instances.

The virtual machine instance type may be selected based at least in part on a predicted minimum set of resource requirements where the predicted minimum set of resource requirements may be based, at least in part, on the software applications that will be installed. For example each software application may have a set of minimum resource requirements such as, for example, memory, CPU speed, network speed, external storage, or other such resource requirements. If the set of desired software applications is known, then a virtual machine instance type that has sufficient resources to support those applications may be initially selected.

The virtual machine instance may then be instantiated on a host computer system with sufficient resources to host the virtual machine instance, and access to the virtual machine instance may be provided to a privileged user or administrator for further configuration. As described above, the display of the virtual machine instance may be streamed from the virtual machine instance to a computing device associated with the privileged user or administrator. Once the privileged user or administrator has access to the virtual machine instance, the privileged user or administrator may then begin configuring the virtual machine instance. First, the virtual machine instance may be put into an administrative mode where any commands from the administrator to the virtual machine instance are received at the virtual machine instance and processed to determine whether the commands from the administrator to the virtual machine instance are configuration commands. These commands (also referred to herein as "events") may be processed by an agent running on the virtual machine instance, by an agent running on the host computer system, by an agent running on the hypervisor of the host computer system, or by some other such agent.

An example of a configuration command may be a command to increase the minimum memory requirements of the virtual machine instance, or may be a command to alter the display settings for the virtual machine instance, or a command to add or remove software from the virtual machine instance. Each of these commands (or events) may alter the configuration of the virtual machine instance from the instantiated instance. As configuration commands are received, they are processed to extract metadata from the configuration command. This metadata may be combined with any metadata already associated with the virtual machine instance and stored in an event metadata store.

In an illustrative example, a virtual machine instance may be instantiated from a virtual machine instance type specifying four virtual CPUs, eight gigabytes ("GB") of memory, two terabytes ("TB") of data storage, a graphics processing unit ("GPU"), a typical operating system, and a suite of office applications. The metadata for such a virtual machine instance may include descriptions of the resource requirements (i.e., the CPUs, memory, data storage, and GPU), the operating system, and the office applications. If the administrator issues configuration commands to increase the memory to sixteen GB, reduce the data storage to one TB, and install a set of accounting applications and a set of inventory applications, the metadata associated with the instantiated virtual machine instance may be updated as a result of these configuration commands.

Because the administrator is configuring the virtual machine instance in the same streaming mode that a typical user may use to access the virtual machine instance, the administrator may have instant feedback on the impact of any configuration decisions. For example, if the administrator reduces data storage to one TB as described above, but upon installing the inventory applications, determines that there is not enough data storage on the virtual machine instance, the administrator may then choose to increase the data storage back to two TB, to not install the inventory applications, and/or to remove some other software applications to provide adequate storage space.

Once the administrator has completed configuring the virtual machine instance, the administrator may then produce a virtual machine image of the running virtual machine instance so that additional instances may be generated from the configured virtual machine instance. The virtual machine image of the running virtual machine instance may be saved in the virtual machine image catalog and may also be associated with the configuration metadata generated during the configuration. In addition to the metadata generated from the configuration commands, additional metadata may be generated by the administrator including, for example, an identifier associated with the virtual machine instance, a user type that the virtual machine instance is intended for, the date the virtual machine instance was created, a desired location for instantiation, and other such metadata. The metadata associated with the virtual machine instance may then be used to search for virtual machine instance types in the virtual machine image catalog and/or to filter instance selections based at least in part on the metadata.

It should be noted that software applications for use by the user may be identified manually by the administrator, or may be generated automatically by monitoring a user's application use while running a virtual machine instance. For example, a virtual machine instance may be configured by an administrator with computing resources that permit all installed software applications to be executed. Monitoring actual usage of the applications by the user may cause a determination that there are software applications installed that are available to the user, but that are never used. The unused software applications may be removed from the user's profile, and a reduced amount of computing resources may be allocated for that user based on the particular software applications actually used. Such a reduced amount of resources and/or reduced number of software applications may be used to create or suggest a new virtual machine instance type based on that reduced demand. Similarly, a set of software applications may be provided to the user on a virtual machine instance designed to only run a single software application at a time (e.g., a virtual machine instance configured with the maximum amount of resources for a single software application). Monitoring actual usage may cause a determination that the user always runs two of the software applications at the same time. As a result of such simultaneous application use being detected, the computing resource requirements for the user and, thus, the resource requirements for the virtual machine instance a corresponding increase in the resources associated with that virtual machine instance.

In the examples described above, the administrator may configure a complete virtual machine instance by instantiating a base instance, configuring the virtual machine instance in an administrative mode, generating a virtual machine image from the virtual machine instance, and associating the generated metadata from the configuration commands with the new virtual machine instance. In such an example, the configured software applications may be instantly available to a user of the virtual machine instance because they may be natively installed in the virtual machine instance. In another example, the administrator may generate an application collection that includes a set of software applications and associated metadata that may be dynamically installed on a virtual machine instance. The process of generating the application collection is similar to that described above but, rather than generating a virtual machine image of the virtual machine instance, the administrator may generate a virtual machine image of the application collection where the virtual machine image of the application collection is generated from a subset of the memory contents of the virtual machine instance (i.e., is generated from the parts of the virtual machine instance associated with the applications of the application collection). Additionally, rather than storing the metadata for the virtual machine instance, metadata for the changes to the virtual machine instance may be stored.

Using the example above with a virtual machine instance instantiated from a virtual machine instance type with four virtual CPUs, eight GB of memory, two TB of data storage, a GPU, an operating system, and a suite of office applications, if the administrator issues configuration commands to increase the memory to sixteen GB and install a set of accounting applications and a set of inventory applications, the metadata may be created for the application collection that includes the accounting applications and the inventory applications. In this example, the metadata may specify the increase in memory, a list of installed accounting applications, and a list of the installed inventory applications while the application collection may include the installed software applications. A user may then be provided with the accounting and inventory applications dynamically, on request and the application collection installed on any suitable virtual machine instance. In such an example, finer grained control of an application collection may also be provided by the administrator by, for example, generating a first application collection for the accounting applications and a second application collection for the inventory applications thereby allowing a user to dynamically access just the accounting applications, just the inventory applications, or both the accounting applications and the inventory applications.

It should be noted that, with the dynamic installation of application collections on virtual machine instances, multiple users may share a single virtual machine instance. In such a multi-tenant environment, several users may access the same virtual machine instance to run, for example, the suite of applications in the accounting application collection. Each user may dynamically request different sets of software applications as needed, with the virtual machine instance managing resources accordingly. Multi-tenant environments are described in more detail below.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a virtual machine instance is configured in accordance with an embodiment. An administrator 102 may use a client computing device 104 to connect 106 to a virtual machine instance 110 provided by a computing resource service provider 112. The administrator 102 may use the client computing device 104 to connect 106 to the virtual machine instance 110 over a network 108 such as those networks described herein. The computing resource service provider 112 may, for example, provide a distributed, virtualized, and/or datacenter environment within which one or more applications, processes, services, virtual machines, and/or other such computer system entities may be executed. The administrator 102 may be a person, or may be a process running on one or more remote computer systems, or may be some other computer system entity, user, or process.

Commands from the administrator 102 to the computing resource service provider 112 may originate from an outside computer system or from within the computing resource service provider environment. The commands to connect 106 to the computing resource service provider 112 may be sent to the virtual machine instance 110, without the intervention of the administrator 102 (i.e., commands to connect 106 to the virtual machine instance 110 may be generated automatically in response to one or more events). The administrator 102 may be a privileged user associated with a customer of the computing resource service provider 112. The administrator 102 may also be a privileged user associated with the computing resource service provider 112.

The computing resource service provider 112 may provide access to one or more host machines, as well as provide access one or more virtual machine instances as may be operating thereon. One or more services provided by the computing resource service provider 112 may also be implemented as and/or may utilize one or more virtual machine instances as may be operating on the host machines. For example, the computing resource service provider 112 may provide a variety of services to users including, but not limited to, the administrator 102 and the users may communicate with the computing resource service provider 112 via an interface such as a web services interface or any other type of interface. While the example environment illustrated in FIG. 1 shows a single connection or interface to the computing resource service provider 112, each of the services may have its own interface and, generally, subsets of the services may have corresponding interfaces in addition to or as an alternative to the single interface.

In an example, a virtual computer system may be a collection of computing resources configured to instantiate virtual machine instances such as the virtual machine instance 110 on behalf of a customer such as the administrator 102. The customer may interact with a virtual computer system service (via appropriately configured and authenticated API requests) to provision and operate virtual machine instances such as the virtual machine instance 110 that are instantiated on physical computing devices hosted and operated by the computing resource service provider 112. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

The virtual machine instance 110 may be configured to provide the contents of the display of the virtual machine instance 110 from a host machine in the computing resource service provider 112 to the client computing device 104. For example, the contents of the display of the virtual machine instance 110 (i.e., the pixels of the display) are provided to the client computing device via a uniform resource identifier ("URI") such as, for example, a uniform resource locator ("URL") and/or a uniform resource name ("URN"). In such an example, the contents of the display of the virtual machine instance 110 may be displayed in a web browser running on the client computing device 104, or a client application operating on the client computing device 104, or using some other display methodology.

The virtual machine instance 110 may also be configured to receive notifications of events from the client computing device 104. As used herein, such events may include keyboard events, mouse events, commands, system configuration events, events from peripherals and/or resources associated with the client computing device 104, and/or other such events. For example, a user such as the administrator 102 may press an "a" key on a keyboard attached to the client computing device 104 while connected to the virtual machine instance 110. Such pressing of the "a" key may generate an event indicating that the "a" key was pressed, which may be sent to the virtual machine instance 110 over the network 108. The event may also include additional data including, but not limited to, an indication of when the event occurred, the duration of the keypress, and/or other such additional data.

Events may also be generated by a user such as the administrator 102 and/or by the client computing device 104 and sent to other systems or services associated with the computing resource service provider 112, which may in turn cause those other systems or services to generate events to the virtual machine instance 110. For example, a user such as the administrator 102 may generate a command event to connect a storage device of a data storage service provided by the computing resource service provider 112, which may cause that data storage service to generate a notification of an event to the virtual machine instance 110 indicating the availability of that storage device. The events sent to other systems or services associated with the computing resource service provider 112 may be sent to computer systems or services located within the computing resource service provider environment, or may be sent to computer systems or services located within an environment provided by a customer of the computing resource service provider 112, or may be sent to computer systems or services located within an environment provided by a third party to the computing resource service provider 112, or may be sent to some other such computer systems or services.

Events received at the virtual machine instance 110 may be processed by the virtual machine instance and may also be sent to another service within the computing resource service provider 112 for metadata analysis. Such events 114 sent for metadata analysis may be processed by first gathering event metadata 116 from the events 114 and then by storing the event metadata in event metadata storage 118. A subset of the notifications of events received by the virtual machine instance 110 may be sent to another service within the computing resource service provider 112 for metadata analysis. In the example described herein the subset of the events received by the virtual machine instance 110 that may be sent to another service within the computing resource service provider 112 for metadata analysis may include events that alter the configuration of the virtual machine instance 110. For example, a keypress event as described above may not be sent to another service within the computing resource service provider 112 for metadata analysis because such an event may not have any impact on the configuration of the virtual machine instance 110. In contrast, a command event to install a software application on the virtual machine instance 110 may be sent to another service within the computing resource service provider 112 for metadata analysis because such an event may have an impact on the configuration of the virtual machine instance 110.

As an example of the type of metadata that may be gathered and stored in the event metadata storage 118, when a command event to install a software application on the virtual machine instance 110 is received, the command event may include the name of the software application, the version of the software application, the time of the installation, the location of the software application source, and/or other such metadata. The metadata associated with the command event to install a software application on the virtual machine instance 110 may also include manually generated metadata provided by a user such as the administrator 102 (e.g., notes about the installation, a list of users that should be associated with the software application, or dates and times to check for updates to the software application). As may be contemplated, the types of event metadata associated with an event described herein are merely illustrative examples and other such types of event metadata may be considered as within the scope of the present disclosure.

When the administrator 102 has finished configuring the virtual machine instance 110, the administrator 102 may next cause a virtual machine image 122 of the virtual machine instance 110 to be generated 120. As used herein, a virtual machine image of a virtual machine instance is a representation of the virtual machine instance in a predetermined state that may be used to instantiate the virtual machine instance in that same state. For example, a virtual machine instance may be configured as described above, with software applications installed, resources allocated, and other configuration parameters of the virtual machine set. The configuration parameters may include, for example, a processor type, an amount of memory, an amount of storage, or other such configuration parameters. An administrator 102 may make configuration changes that cause an alteration to one or more of these configuration parameters.

A virtual machine image of such a virtual machine instance may then be produced from the virtual machine instance in a predetermined state such as, for example, a paused or stopped state so that a new instance of the virtual machine may be instantiated from the virtual machine image in that same state. In an embodiment, the virtual machine image is created by copying the memory contents of the virtual machine instance when it is in the predetermined state. In another embodiment, the virtual machine image is created by recording data and/or metadata associated with the virtual machine instance sufficient to recreate the virtual machine instance in the predetermined state. In another embodiment, the virtual machine instance is placed in a temporary state such as, for example, a paused state before the virtual machine image is created. In another embodiment, the virtual machine instance is suspended and swapped to secondary storage so that virtual machine image may be created from the swapped virtual machine instance.

When the virtual machine image 122 has been created, some or all of the event metadata created during the configuration and stored in the event metadata storage 118 may be extracted from the event metadata storage 118 and used to create a set of virtual machine image metadata 126 that may be associated 124 with the virtual machine image 122. Such virtual machine image metadata 126 may include the event metadata generated as described above as well as additional metadata generated by the administrator 102 such as, for example, a name of the virtual machine image, an identifier associated with the virtual machine image, a description of the virtual machine image, a set of users or roles that may use the virtual machine image, hardware resources needed to host the a virtual machine instantiated from the virtual machine image, or other such additional metadata. The virtual machine image metadata 126 may be used to search for, filter, provision, instantiate, and migrate a virtual machine instance created from the virtual machine image as described below.

Figure 2:
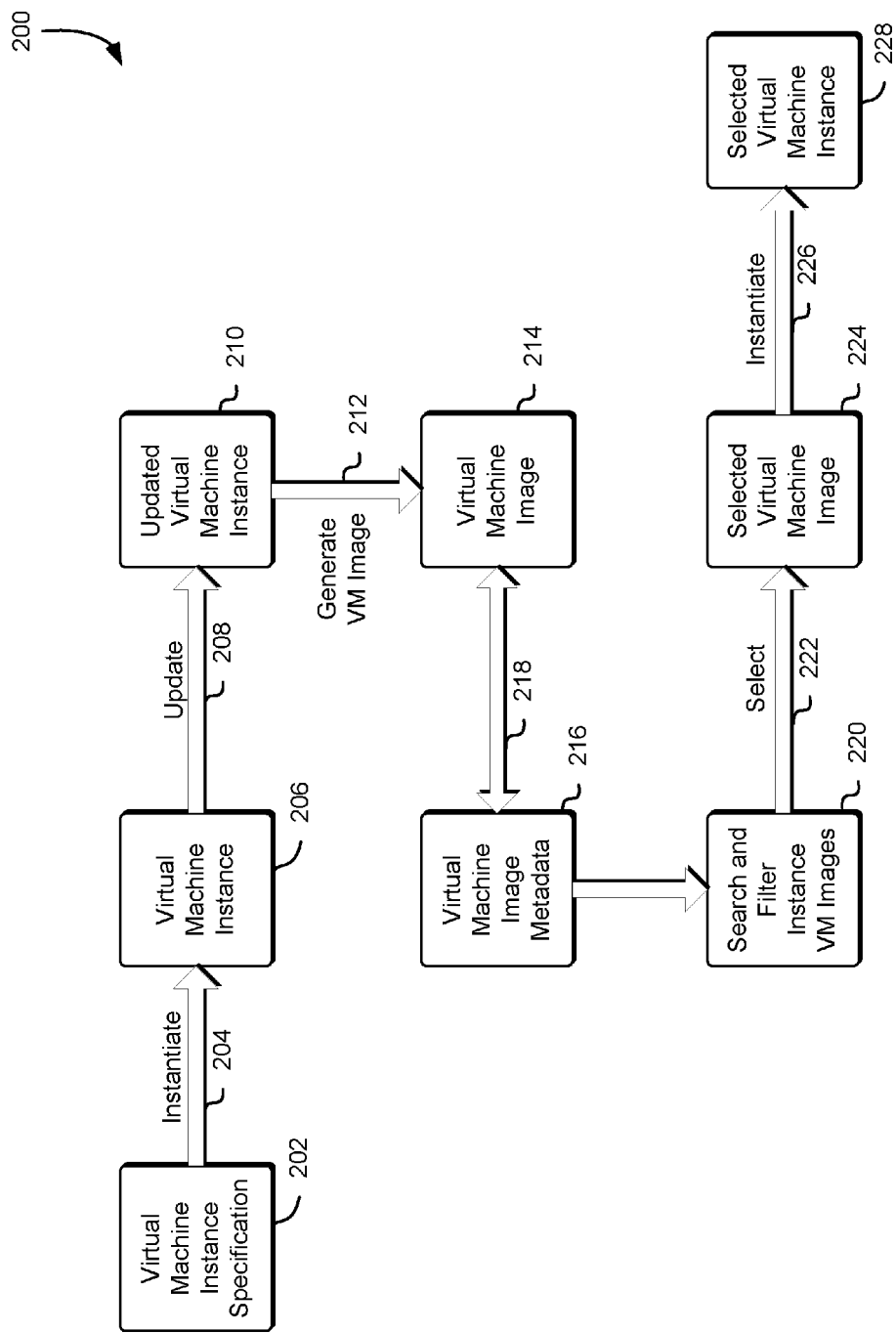
FIG. 2 illustrates an example diagram where a virtual machine instance is configured, the configuration is stored, and additional virtual machine instances are instantiated from that configuration.

FIG. 2 illustrates an example diagram 200 where a virtual machine instance is configured, the configuration is stored, and additional virtual machine instances are instantiated from that configuration as described in connection with FIG. 1 and in accordance with an embodiment. First, a virtual machine instance specification 202 is used to instantiate 204 a virtual machine instance 206. The virtual machine instance specification 202 may be a virtual machine image generated from a virtual machine instance, which may be usable to instantiate a virtual machine instance 206 as described above. The virtual machine instance specification 202 may also be a description of a virtual machine instance usable to instantiate the virtual machine instance 206. The virtual machine instance specification 202 may also be an empty or default specification, causing the virtual machine instance 206 to be a default virtual machine instance with, for example, only simple software applications installed and/or simple capabilities defined. For example, a virtual machine instance specification may be a default UNIX installation that, when instantiated, has only the operating system components installed.

The commands used to instantiate 204 the virtual machine instance 206 from the virtual machine instance specification 202 may be executed by a virtual computing service operating within a computing resource service provider such as the computing resource service provider 112 described in connection with FIG. 1. Such a virtual computing service may be configured to locate the virtual machine instance specification 202 from a virtual machine image catalog (i.e., a collection of virtual machine images), determine a location (i.e., a host computer system) upon which to instantiate 204 the virtual machine instance 206, provision the virtual machine instance 206, monitor the virtual machine instance 206, provide the contents of the display of the virtual machine instance 206 to a user of the virtual machine instance 206, deliver events from the user to the virtual machine instance 206, obtain a virtual machine image from the virtual machine instance 206, terminate the virtual machine instance 206, and/or perform other operations related to providing the virtual machine instance 206 to one or more users of the virtual machine instance 206. The virtual computing service may also be configured to obtain metadata about the virtual machine instance 206 so that such metadata may be collected and processed as described above.

After the virtual machine instance 206 is running, a privileged user such as the administrator 102 described in connection with FIG. 1 may perform one or more operations to update 208 the configuration of the virtual machine instance 206. For example, the privileged user may change virtual machine configuration settings (e.g., the amount of memory, the amount of storage, or the presence of other computer system resources), add software applications, remove software applications, update software applications, or other such configuration operations. As the one or more operations to update 208 the configuration of the virtual machine instance 206 are performed, an updated virtual machine instance 210 is produced.

As each update is performed, the privileged user may determine that a virtual machine image of the updated virtual machine instance 210 may be generated 212 as described above. The privileged user may determine that the virtual machine image of the updated virtual machine instance 210 may be generated 212 one or more times during the configuration of the virtual machine instance 206. So, for example, the privileged user may determine that virtual machine image of the updated virtual machine instance 210 should be generated 212 after every configuration change (e.g., after each configuration change and/or software change) so that each step may be verified separately. The privileged user may also determine that a virtual machine image of the updated virtual machine instance 210 should be generated 212 only after all configuration changes have been completed and tested.

Each virtual machine instance image 214 may then be associated 218 with a set of virtual machine image metadata 216 as described above. The virtual machine image metadata 216 may then be used to search and filter virtual machine images 220 using one or more search parameters (e.g., amount of memory, type of processor, operating system, or installed applications) so that one or more virtual machine images may be selected 222 and the selected virtual machine image 224 may be instantiated 226 from the selected virtual machine image 224 to produce the selected virtual machine instance 228. In an embodiment, the selected virtual machine instance 228 that is instantiated 226 from the selected virtual machine image 224 can be further updated by the privileged user to produce additional updated virtual machine images.

For example, a privileged user may begin with a default virtual machine instance specification and may install a suite of software common to all users within the privileged user's domain. This first updated virtual machine instance may be saved as a virtual machine image with metadata describing the virtual machine image. Additional virtual machine instances may be instantiated from this virtual machine image and each may be configured for a certain class of user. Each of these derived virtual machine images may be further refined for finer and finer subdivisions of types of instances as needed.

Figure 3:
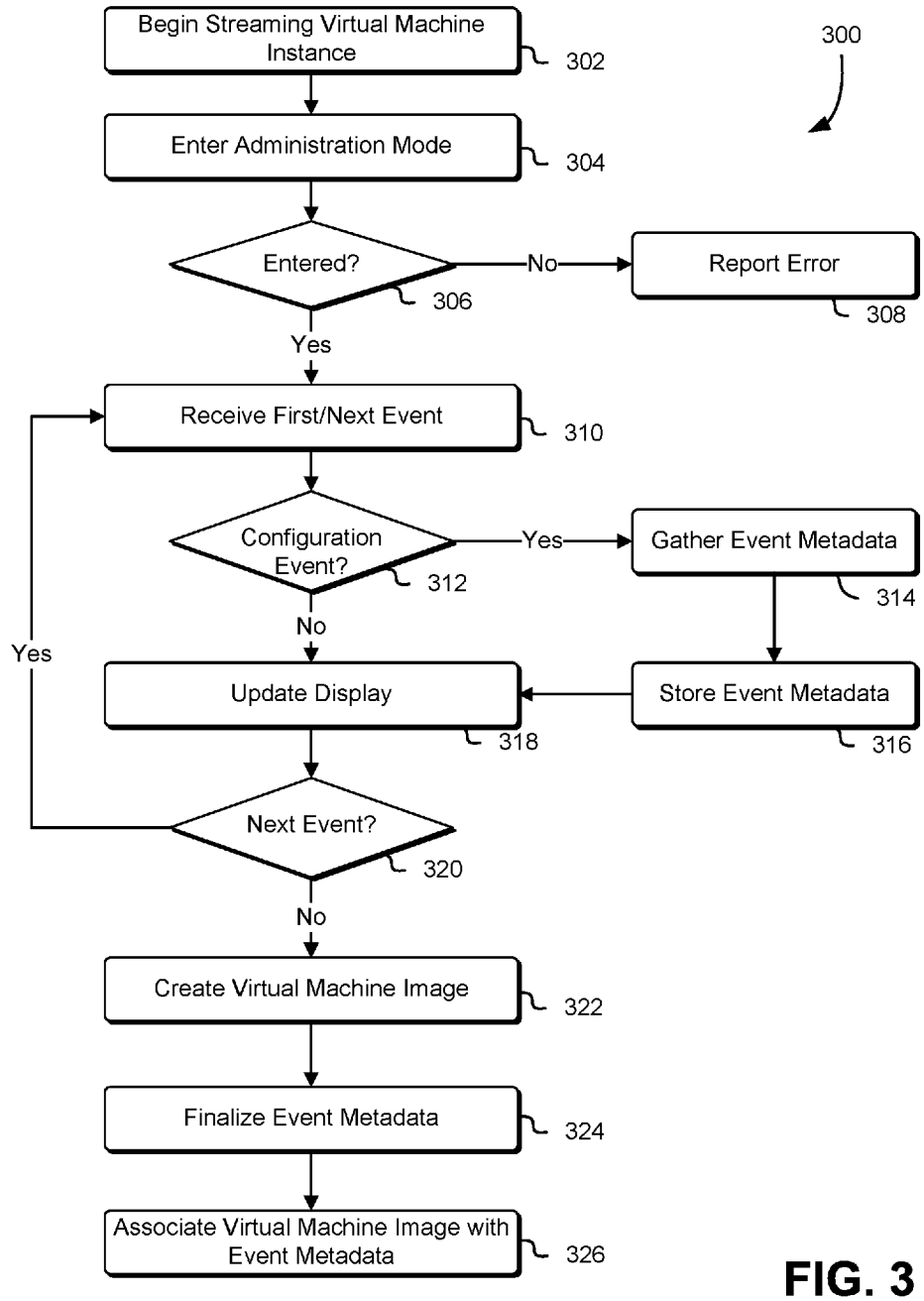
FIG. 3 illustrates an example process for configuring a virtual machine instance and storing that configuration.

FIG. 3 illustrates an example process 300 for configuring a virtual machine instance and storing that configuration as described in connection with FIG. 1 and in accordance with an embodiment. A service of a computing resource service provider such as the computing resource service provider 112 described in connection with FIG. 1 may perform the process 300 illustrated in FIG. 3. First, the service of the computing resource service provider may begin 302 streaming a virtual machine instance as described above, such that the display contents of the virtual machine instance are provided to a client computing device associated with a privileged user and events from the client computing device are provided to the virtual machine instance. In response to a received command from the computing device associated with the privileged user, the virtual machine instance may enter 304 an administrative mode where the virtual machine instance may continue operating in the streaming mode as described above, but additional processing of events received from the client computing device may be performed to determine whether those events are configuration events.

If the administrative mode is not entered 306 because, for example, there is an error in initiating the process to receive and analyze metadata from the configuration events, the service of the computing resource service provider may report 308 an error to the privileged user accessing the virtual machine instance, to a user or entity associated with the computing resource service provider, or to a combination of these and/or other such entities.

If the administrative mode is entered 306, the service of the computing resource service provider may begin receiving 310 notifications of input events from the client device connected to the virtual machine instance. The service of the computing resource service provider may first perform one or more operations to determine whether the input event is a configuration event 312 and, if the event is a configuration event may gather 314 event metadata from the configuration event and store 316 that event metadata in the metadata storage as described above. The service of the computing resource service provider may then update 318 the display contents based on the event and wait for a next event 320. The service of the computing resource service provider may continue receiving and processing events until there or no more events. In an embodiment, the privileged user signals that there will be no more configuration events providing a notification to the virtual machine instance and/or to the service of the computing resource service provider. In another embodiment, this notification will cause the service of the computing resource service provider to exit the administrative mode and proceed with the process of finalizing the virtual machine image as described herein.

When there are no more events, the service of the computing resource service provider may next create 322 the virtual machine image from the configured virtual machine instance, finalize 324 the event metadata, and associate 326 the virtual machine image with the finalized event metadata so that the finalized metadata may be used to search for and/or filter the virtual machine image for later instantiation.

Figure 4:
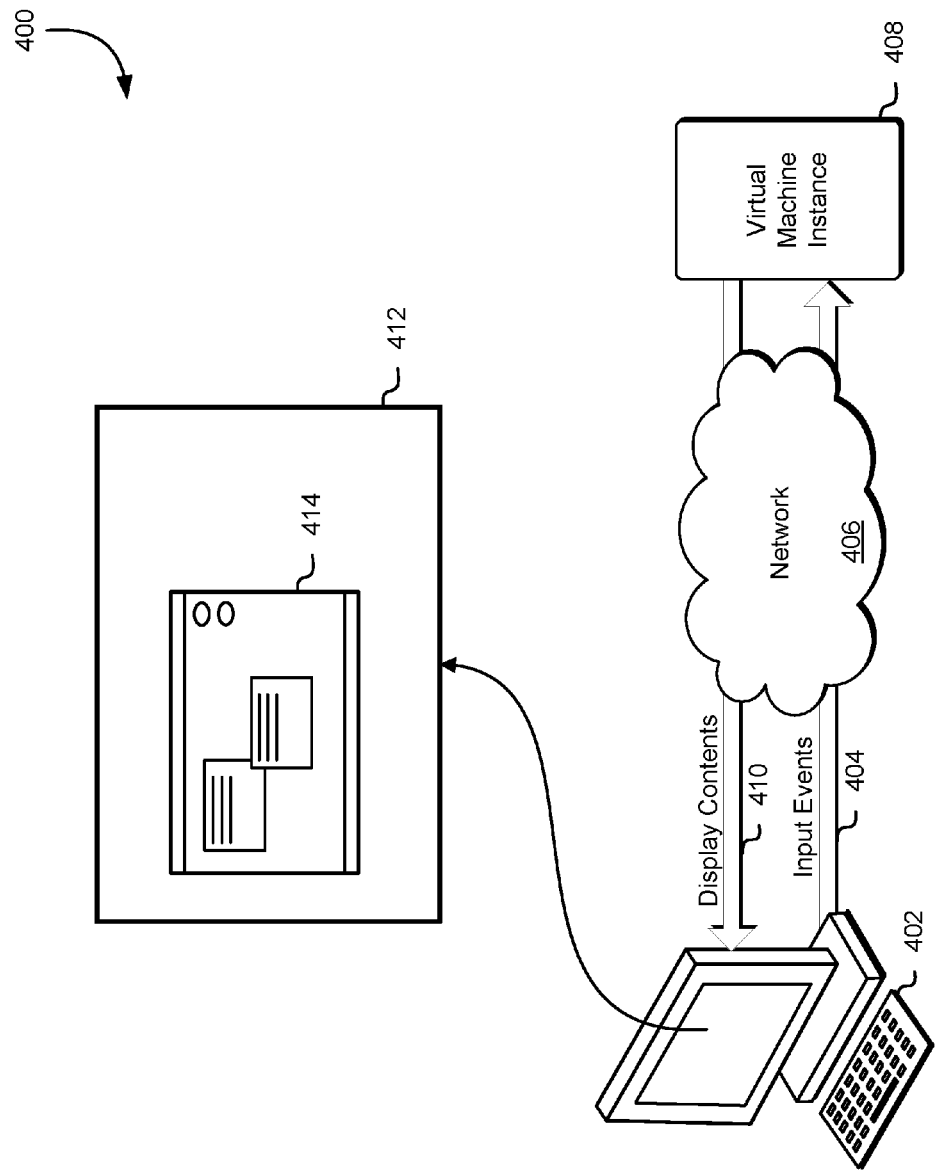
FIG. 4 illustrates an example environment where the display of a virtual machine instance is provided to a client computing device and input events are provided from the client computing device to the virtual machine instance.

FIG. 4 illustrates an example environment 400 where the display of a virtual machine instance is provided to a client computing device and notifications of input events are provided from the client computing device to the virtual machine instance as described in connection with FIG. 1 and in accordance with an embodiment. A client computing device 402 may connect to a virtual machine instance 408 via a network 406 as described above. As a user interacts with the virtual machine instance 408, notifications of input events 404 may be sent to the virtual machine instance 408 via the network 406. For example, if the user presses a key or moves a mouse, those key presses or mouse movements may be used to generate input events and notifications of those input events may be sent to the virtual machine instance 408 as notifications of input events 404. The virtual machine instance 408 may then receive the notifications of those input events and process the associated input events, may update the display of the virtual machine instance 408, and may then provide the display contents 410 (i.e., the pixels of the display) to the client computing device. In the example illustrated in FIG. 4, the display contents 410 are displayed within a window 414 on the display 412 of the client computing device 402.

As an example, a user may first move a mouse and click on an icon to start a text editing application. For this first action, a plurality of events may be generated including one or more mouse movement events, the mouse click down event, and the mouse click up event. The mouse movement events may be processed by the virtual machine instance 408 and a position of the mouse pointer may be updated and new pixels showing the updated mouse pointer on the display may be sent to the window 414 on the display 412 of the client computing device 402. Then, once the text editing application is running, each keypress in the text editing window may cause the display to be further updated based on the new text.

In an embodiment, the window 414 on the display 412 of the client computing device 402 is a web browser window. In such an embodiment, the virtual machine instance 408 may be accessed by a URI as described above. Such an embodiment, where the window 414 on the display 412 of the client computing device 402 is a web browser may be referred to herein as a "clientless display" as no dedicated client software need be installed on the client computing device in order to interact with the virtual machine instance 408. In another embodiment, the window 414 on the display 412 of the client computing device 402 is a window provided by a dedicated client application or agent installed and operating on the client computing device. In such an embodiment, the virtual machine instance 408 may also be accessed by an URI as described above, or may be accessed using some other location methodology. Such an embodiment, where the window 414 on the display 412 of the client computing device 402 is a dedicated client may be referred to herein as a "dedicated client display" as dedicated client software is installed on the client computing device so that a user may interact with the virtual machine instance 408.

Figure 5:
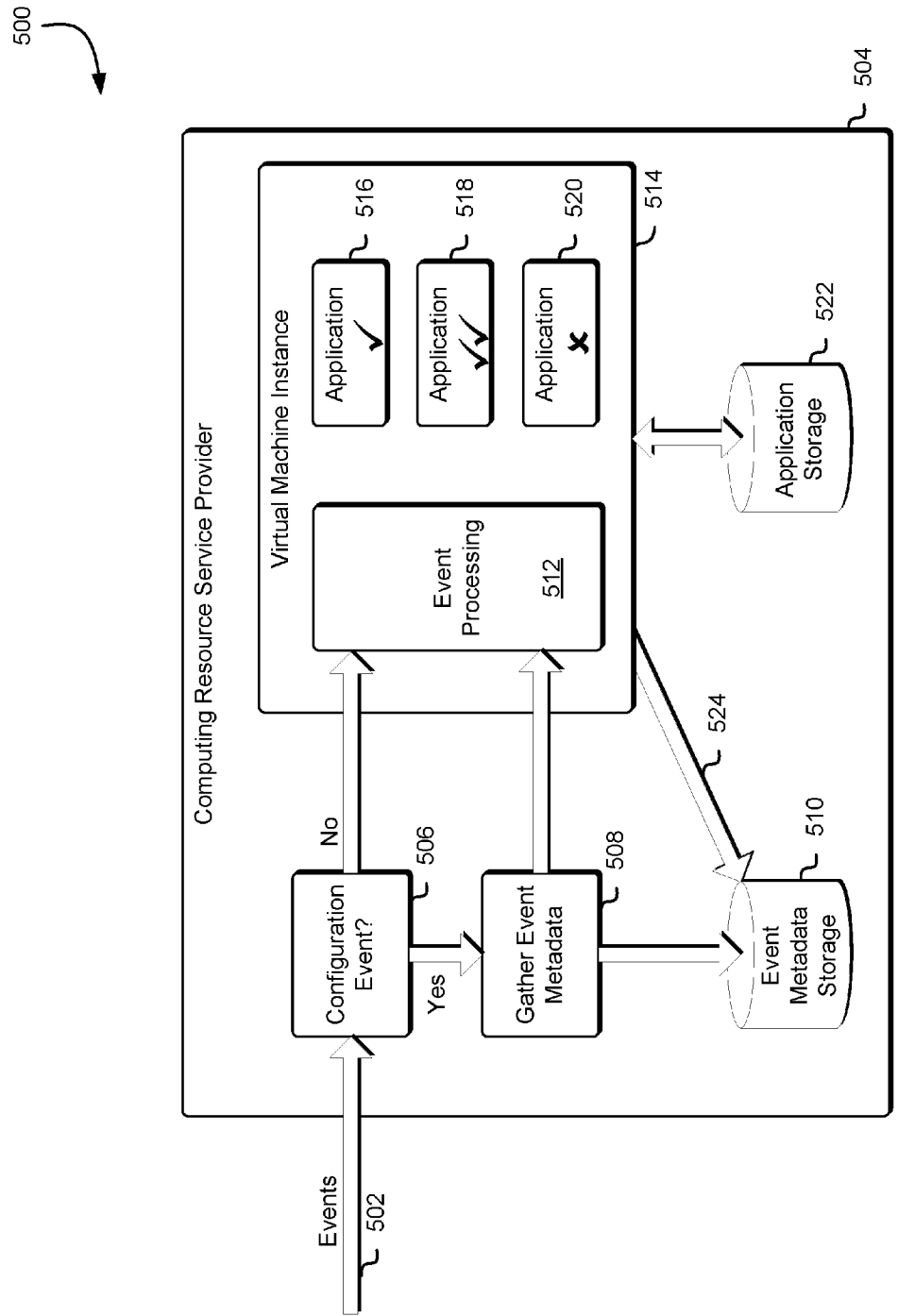
FIG. 5 illustrates an example environment where metadata associated with configuring a virtual machine instance is gathered and stored.

FIG. 5 illustrates an example environment 500 where metadata associated with configuring a virtual machine instance is gathered and stored as described in connection with FIG. 1 and in accordance with an embodiment. A virtual machine instance 514 is instantiated and provided to a privileged user in a streaming mode as described above. As used herein, a "streaming mode" is a mode of operation of a virtual machine instance wherein the display contents (i.e., the pixels of the display) of the virtual machine instance are provided to the user via a network connection for display on the client computing device using either a clientless display or a dedicated client display and the notifications of the input events (e.g., keyboard events, mouse events, and other such events) are provided from the client computing device to the virtual machine instance.

Notifications of events 502 such as those described above are received at a computing resource service provider 504. First, it is determined whether the events 502 are configuration events 506. As described above, configuration events 506 are events that alter the configuration of the virtual machine instance 514. Examples of configuration events include, but are not limited to, events directed to changing parameters of the virtual machine instance (e.g., the amount of memory, the type of CPU, the amount of storage, and/or the availability of other computer system resources), events directed to adding software applications to the virtual machine instance, events directed to removing software applications from the virtual machine instance, events directed to altering software applications on the virtual machine instance (e.g., updating software versions), or other such configuration events.

It should be noted that while the example illustrated in FIG. 5 shows the events 502 being received by the computing resource service provider 504 for metadata analysis and processing prior to being provided to the virtual machine instance 514, the events may also be provided to the virtual machine instance 514 and the virtual machine instance may then provide the events for metadata analysis and processing by the computing resource service provider 504. As may be contemplated, the order of operations for performing the metadata analysis and processing of the events relative to those events being provided to the virtual machine instance described herein is merely an illustrative example and other orders of operations for performing the metadata analysis and processing of the events relative to those events being provided to the virtual machine instance may be considered as within the scope of the present disclosure.

If a received event of the events 502 is not a configuration event 506, the received event may be provided to the virtual machine instance 514 for event processing 512 as described below. For example, a received event that specifies a mouse movement from one location on the display to another location on the display is typically not a configuration event 506 and, as such, the event would be provided to the virtual machine instance 514 for event processing 512. Conversely, if the received event of the events 502 is a configuration event 506, a service of the computing resource service provider 504 may first gather event metadata 508 from the received event and then store that event metadata in event metadata storage 510 as described above. The received event may then be provided to the virtual machine instance 514 for event processing 512. As an example of a received event that is a configuration event 506, a received event that specifies the installation of a software application does alter the configuration of the virtual machine instance 514. As such, the event would be processed to first gather event metadata 508 from the received event and store that event metadata in event metadata storage 510 as described above before being provided to the virtual machine instance 514 for event processing 512.

Event processing 512 is the process of receiving the event at the virtual machine instance 514 and performing operations as specified by the event. For example, the received event that specifies a mouse movement from a first location on the display to a second location on the display may be processed by the virtual machine instance 514 such that the mouse pointer location is updated from the first location to the second location and also such that the display is updated so that the mouse pointer is displayed at the second location. In another example of event processing 512, a received event that specifies the installation of a software application may be processed by the virtual machine instance 514 such that the software application is located and installed, thereby making the software application available to users.

The example illustrated in FIG. 5 briefly illustrates the result of receiving notifications of and processing three configuration events related to configuring software applications. In the example illustrated, a first configuration event (one of the events 502) received at the computing resource service provider 504 is a configuration event to install a software application on the virtual machine instance. As the event is a configuration event 506, a service of the computing resource service provider 504 may first gather event metadata 508 from the configuration event (e.g., the name of the software application, the version of the software application, or the date and time of the installation) and then store that event metadata in event metadata storage 510 as described above. The configuration event may then be provided to the virtual machine instance 514 for event processing 512. In this case, the event processing 512 may include retrieving the software application from application storage 522 and installing the software application 516 on the virtual machine instance 514.

A second configuration event may follow to update a software application running on the virtual machine instance 514. As this event is also a configuration event 506, the service of the computing resource service provider 504 may first gather event metadata 508 from the configuration event (e.g., the new version of the software application and/or the date and time of the update) and then store that event metadata in event metadata storage 510 as described above. The configuration event may then be provided to the virtual machine instance 514 for event processing 512. In this case, the event processing 512 may include retrieving the software update from application storage 522 and updating the software application 518 on the virtual machine instance 514.

A third configuration event may follow to remove a software application running on the virtual machine instance 514. As this event is also a configuration event 506, the service of the computing resource service provider 504 may also gather event metadata 508 from the configuration event (e.g., the date and time of the removal) and then store that event metadata in event metadata storage 510 as described above. In this case, the service of the computing resource service provider 504 may also update previously stored metadata to indicate that the software application is no longer available on this virtual machine instance. The configuration event may then be provided to the virtual machine instance 514 for event processing 512. In this case, the event processing 512 may include removing the software application 520 on the virtual machine instance 514 and updating any associated configuration settings on the virtual machine instance 514.

In an embodiment, the virtual machine instance 514 maintains a connection 524 with the event metadata storage so that the virtual machine instance 514 may update event metadata as needed. For example, configuration event may be received and, when the service of the computing resource service provider 504 gathers event metadata 508 from the configuration event, the event may be marked as, for example, pending or staged. When the event is provided to the virtual machine instance 514 for event processing 512, the virtual machine instance 514 may process the event as described above (e.g., may install software, remove software, update software, or perform some other configuration operations). The virtual machine instance may then use the connection 524 to the event metadata storage 510 to change the status of the pending or staged event to, for example, completed.

It should be noted that while in the example illustrated in FIG. 5, the application storage 522 is shown as being located within the computing resource service provider environment, the application may also be retrieved from other locations including, but not limited to, a repository provided by the developer of the application, physical media attached to the client computing device (e.g., a compact disc, digital video disc, or a hard drive), physical media attached to a computing resource service provider host machine, or some other location.

Figure 6:
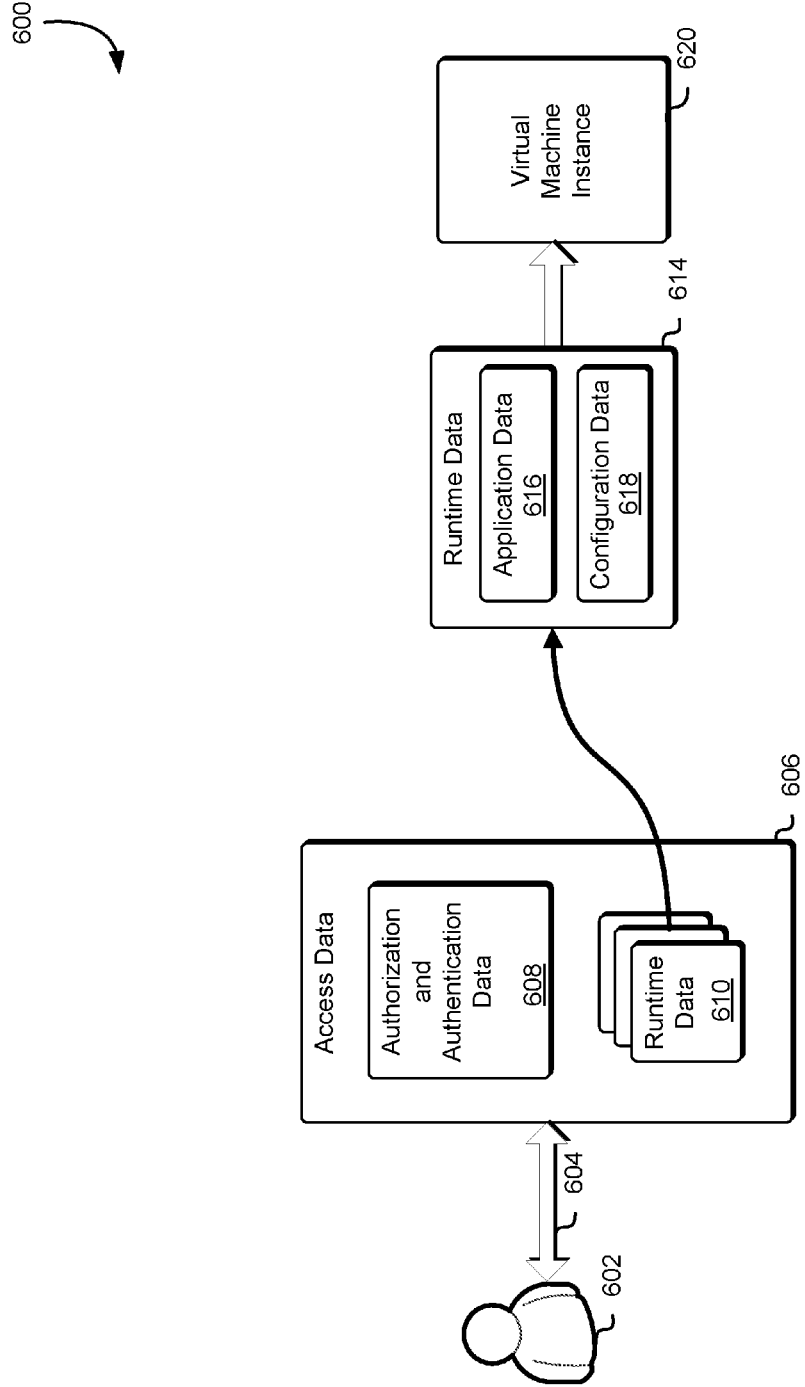
FIG. 6 illustrates an example environment where a configured virtual machine instance is instantiated based on user data.

FIG. 6 illustrates an example environment 600 where a configured virtual machine instance is instantiated based on user data as described in connection with FIG. 1 and in accordance with an embodiment. In the example illustrated in FIG. 6, a user 602 is associated 604 with a set of access data 606. The access data 606 may include a first set of authorization and authentication data 608, which may include URIs, roles, credentials, groups, and other such authorization and authentication data usable to access an instantiated virtual machine instance. The access data 606 may also include or be associated with one or more sets of runtime data 610. It should be noted that, while in the example illustrated in FIG. 6, the one or more sets of runtime data 610 are shown as being contained within the access data 606, the one or more sets of runtime data 610 may instead be associated with the access data rather than contained therein.

Each set of runtime data of the one or more sets of runtime data 610 may include data usable by a computing resource service provider such as the computing resource service provider 112 described in connection with FIG. 1 to select a suitable virtual machine instance for instantiation. In the example illustrated in FIG. 6, a set of runtime data 614 contains application data 616 and configuration data 618. The application data 616 may specify the applications associated with that set of runtime data (i.e., the one or more applications that should be provided to the user by the instantiated virtual machine instance). The configuration data 618 may specify the type and configuration of the virtual machine instance that should be instantiated including, but not limited to, minimum memory, storage, CPU, network bandwidth, or other resources. In an embodiment, the configuration data 618 specifies a virtual machine instance specification selectable from a virtual machine image catalog. In another embodiment, the configuration data 618 specifies a virtual machine image such as those described herein.

As the access data 606 may include or be associated with a plurality of sets of runtime data 610, a virtual machine instance 620 may be instantiated that provides the capabilities of all of the sets of runtime data 610. For example, a first set of runtime data may specify a first minimum virtual machine configuration (e.g., minimum memory, CPU, storage, network bandwidth, and resources) and a set of accounting applications as described above and a second set of runtime data may specify a second minimum virtual machine configuration (e.g., minimum memory, CPU, storage, network bandwidth, and resources) and a set of inventory applications as described above. A user 602 associated 604 with a set of access data 606 that includes or is associated with these two sets of runtime data may, upon requesting a virtual machine instance, be provided with a virtual machine instance that satisfies both minimum virtual machine configurations (i.e., has sufficient resources to satisfy both configurations) and that has both the accounting and inventory applications installed.

It should be noted that, because a user 602 may be associated 604 with one or more sets of access data 606 and each set of access data 606 may include or be associated with one or more sets of runtime data 610, different types of access may be provided to a user 602 depending on the set of access data. For example, as described above, a set of access data may include or be associated with a first set of runtime data related to accounting applications and a second set of runtime data related to inventory applications and a user associated with that set of access data may be provided with a virtual machine instance having both sets of applications. However, the user may also be associated with a second set of access data that includes or is associated with only the first set of runtime data related to the accounting applications and a third set of access data that includes or is associated with only the second set of runtime data related to the inventory applications. Thus, the user may be provided with a virtual machine instance with just the accounting applications, just the inventory applications, or both the accounting applications and the inventory applications depending on the set of access data selected for use when the user requests the virtual machine instance.

Figure 7:
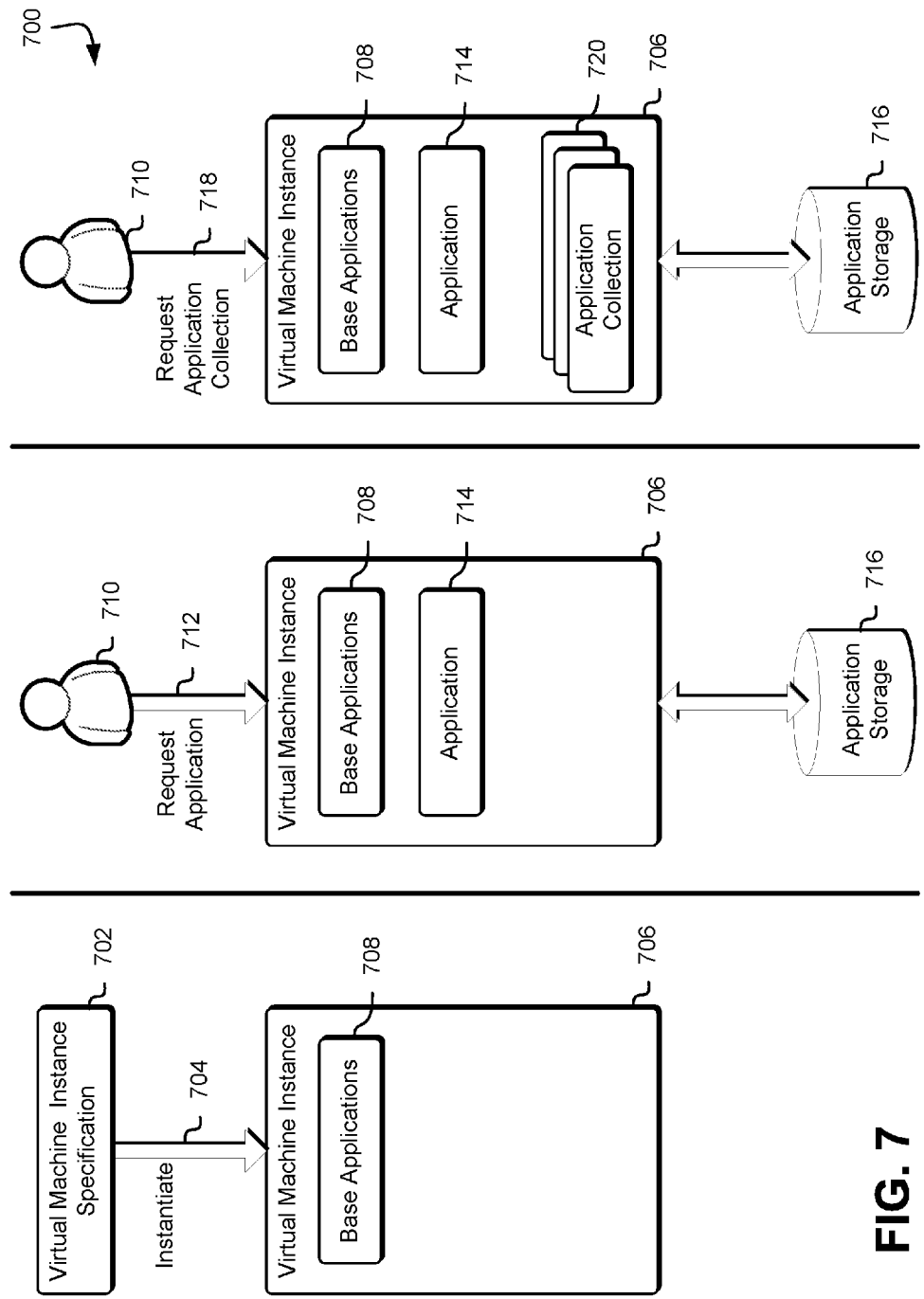
FIG. 7 illustrates an example environment where software applications are dynamically installed on a virtual machine instance.

FIG. 7 illustrates an example environment 700 where applications are dynamically installed on a virtual machine instance as described in connection with FIG. 1 and in accordance with an embodiment. In the example illustrated in FIG. 7, a virtual machine instance 706 is instantiated 704 from a virtual machine instance specification 702 as described above. The virtual machine instance 706 may be instantiated 704 with one or more base applications 708 such as, for example, applications usable to install other software applications, applications usable to allow users to connect to the virtual machine instance, applications usable to provide the display contents to a client computing device associated with a user, and/or applications usable to receive and process the notifications of the input events.

A user 710 may then access the virtual machine instance 706 as described above and may request access to an application 712 that is not one of the base applications 708. For example, a user 710 may request access to a word processing application that is not one of the base applications 708. In response to this request, the virtual machine instance 706 may perform one or more operations to retrieve the application from application storage 716 and install the application 714 on the virtual machine instance 706. The user may then run the application 714 and interact with it as described above (i.e., provide the display contents to a client computing device from the virtual machine instance 706 and provide the notifications of the input events from the client computing device to the virtual machine instance 706). The application 714 may be removed from the virtual machine instance 706 at some point in time after the user has finished using the application or it may remain installed on the virtual machine instance 706.

The user 710 may then request access to an application collection 718 that contains one or more applications that are not one of the base applications 708 and are also not the same as the application 714. Using the examples described above, the application collection 718 may be an application collection that, for example, includes a suite of accounting applications, a set of inventory applications, or multiple sets of applications. In response to the request, the virtual machine instance 706 may perform one or more operations to retrieve the application collection from application storage 716 and install the software applications in the application collection 720 on the virtual machine instance 706. The user may then run the software applications in the application collection 720 and interact with those applications as described above (i.e., provide the display contents to a client computing device from the virtual machine instance 706 and provide the notifications of the input events from the client computing device to the virtual machine instance 706). As with the application 714, one or more of the software applications in the application collection 720 may be removed from the virtual machine instance 706 at some point in time after the user has finished using the applications in the application collection.

Figure 8:
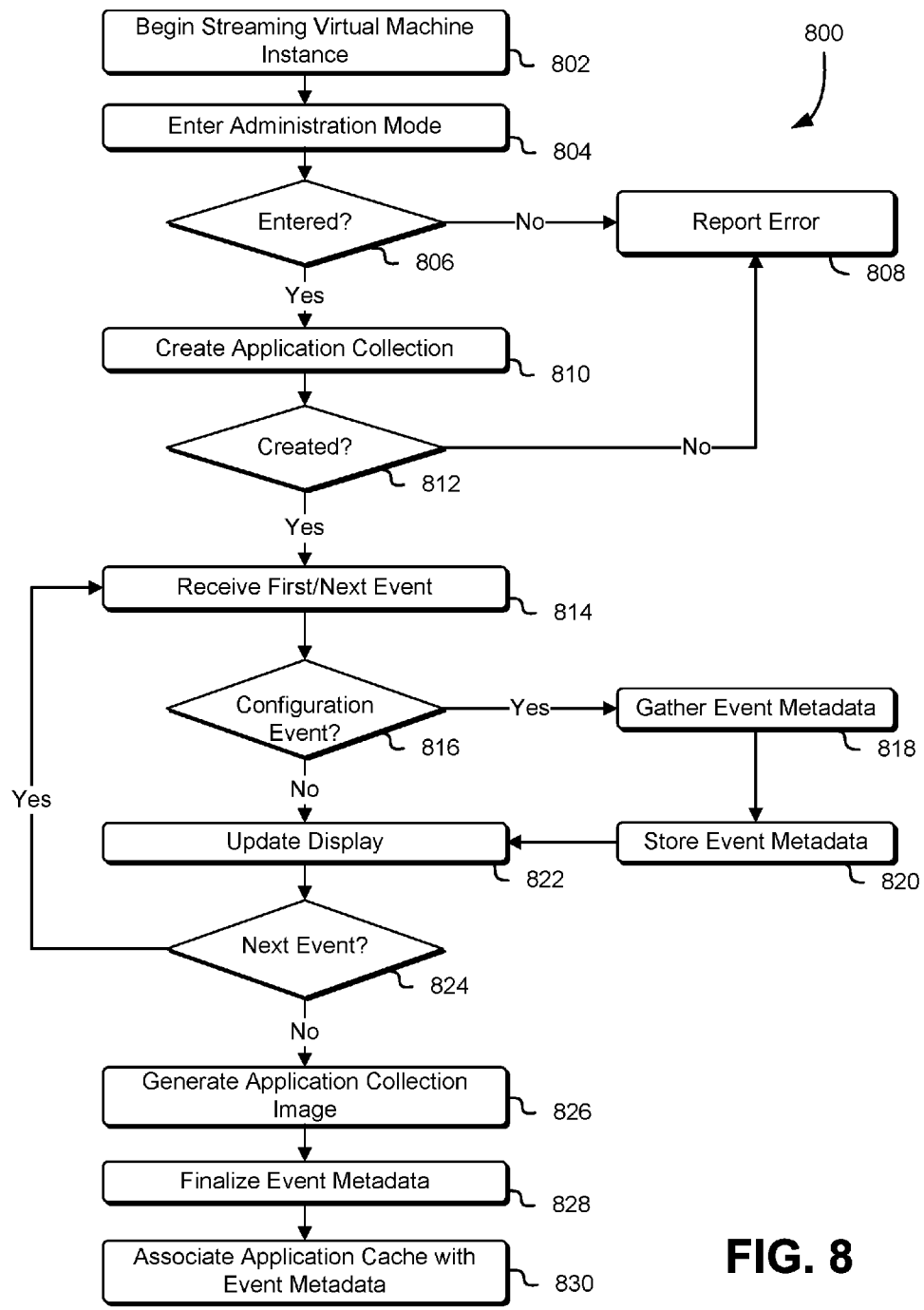
FIG. 8 illustrates an example process for dynamically installing software applications on a virtual machine instance.

FIG. 8 illustrates an example process 800 for dynamically installing applications on a virtual machine instance as described in connection with FIG. 1 and in accordance with an embodiment. A service of a computing resource service provider such as the computing resource service provider 112 described in connection with FIG. 1 may perform the process 800 illustrated in FIG. 8. First, the service of the computing resource service provider may begin 802 streaming a virtual machine instance as described above, such that the display contents of the virtual machine instance are provided to a client computing device associated with a privileged user and events from the client computing device are provided to the virtual machine instance. In response to a received command from the computing device associated with the privileged user, the virtual machine instance may enter 804 an administrative mode where the virtual machine instance may continue operating in the streaming mode as described above, but additional processing of events received from the client computing device may be performed to determine whether those events are configuration events.

As described above, if the administrative mode is not entered 806 because, for example, there is an error in initiating the process to receive and analyze metadata from the configuration events, the service of the computing resource service provider may report 808 an error to the privileged user accessing the virtual machine instance, to a user or entity associated with the computing resource service provider, or to a combination of these and/or other such entities. Conversely, if the administrative mode is entered 806, the service of the computing resource service provider may next create 810 an application collection usable to dynamically install one or more software applications as described above. If the application collection is not created 812 because, for example, there is an error in creating the application collection, the service of the computing resource service provider may also report 808 an error to the privileged user accessing the virtual machine instance, to a user or entity associated with the computing resource service provider, or to a combination of these and/or other such entities.

If the application collection is created 812, the service of the computing resource service provider may begin receiving 814 notifications of the input events from the client device connected to the virtual machine instance. The service of the computing resource service provider may first perform one or more operations to determine whether the event is a configuration event 816 and, if the event is a configuration event may gather 818 event metadata from the configuration event and store 820 that event metadata in the metadata storage as described above. The service of the computing resource service provider may then update 822 the display contents based on the event and wait for a next event 824. The service of the computing resource service provider may continue receiving and processing events until there or no more events. In an embodiment, the privileged user signals that there will be no more configuration events providing a notification to the virtual machine instance and/or to the service of the computing resource service provider. In an embodiment, this notification will cause the service of the computing resource service provider to exit the administrative mode and proceed with the process of finalizing the virtual machine image as described herein.

When there are no more events, the service of the computing resource service provider may generate 826 an image from the applications installed on the virtual machine instance (i.e., generate an image for the application collection), finalize 828 the event metadata, and associate 830 the application collection with the finalized event metadata so that the finalized metadata may be used to search for and/or filter the application collection for later installation on a virtual machine instance.

Figure 9:
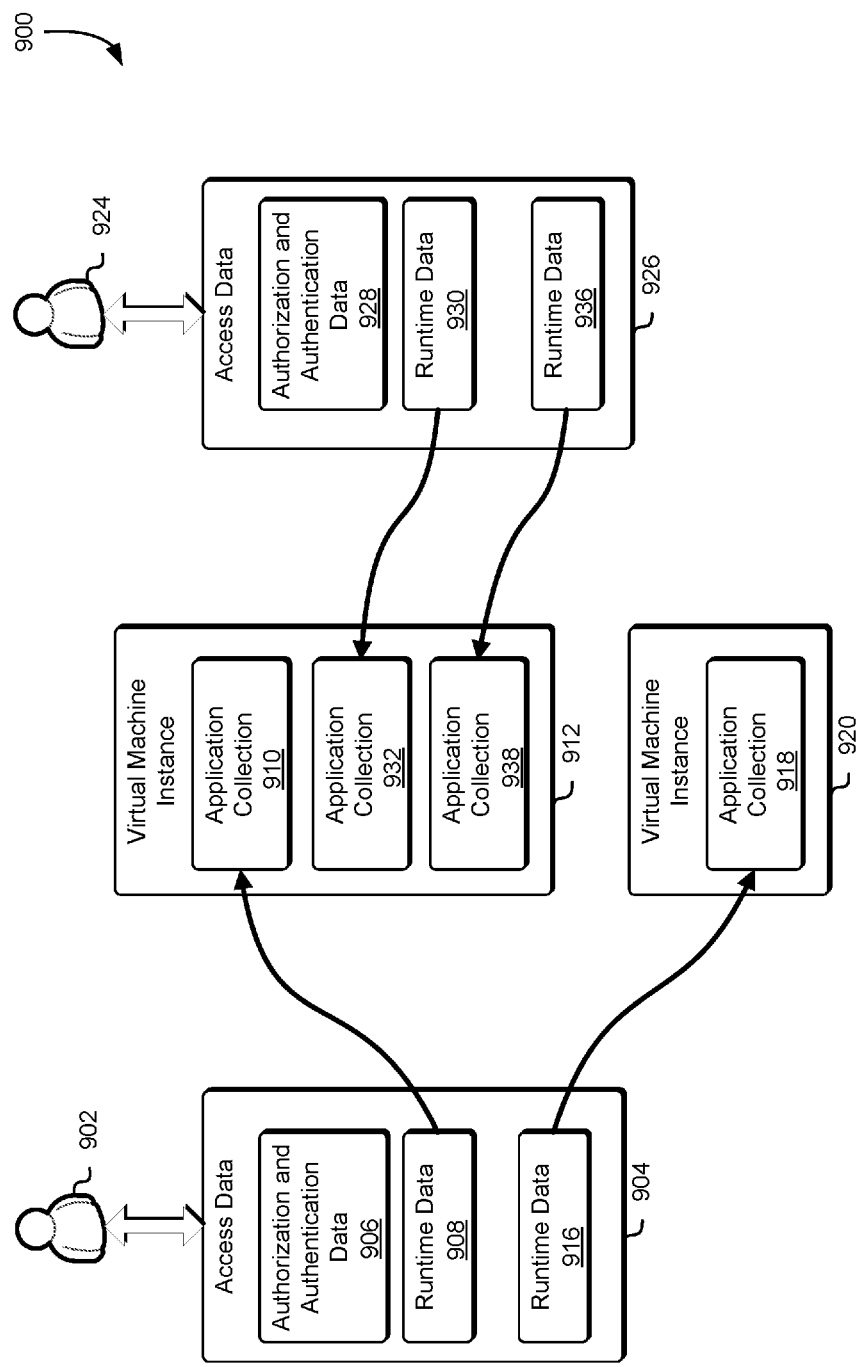
FIG. 9 illustrates an example environment where software applications are dynamically installed on virtual machine instances in a multi-tenant environment.

FIG. 9 illustrates an example environment 900 where applications are dynamically installed on virtual machine instances in a multi-tenant environment as described in connection with FIG. 1 and in accordance with an embodiment. In a multi-tenant environment such as the one illustrated in FIG. 9, a virtual machine instance may be configured to host applications for multiple users. Because the users may change, the applications may typically be dynamically installed as described above.

In the example illustrated in FIG. 9, a first user 902 may have an associated set of access data 904 as described above. The access data 904 includes authorization and authentication data 906, a first set of runtime data 908 associated with a first application collection, and a second set of runtime data 916 associated with a second application collection. As a result of the first user 902 requesting virtual machine access as specified by the associated access data 904, a first application collection 910 may be dynamically installed on a multi-tenant virtual machine instance 912 and a URI corresponding to this multi-tenant virtual machine instance 912 may be stored by a server running on a computing resource service provider such as the computing resource service provider 112 described in connection with FIG. 1.

Similarly, a second user 924 may have an associated set of access data 926 that includes authorization and authentication data 928, a third set of runtime data 930 associated with a third application collection, and a fourth set of runtime data 936 associated with a second application collection. As a result of the second user 924 requesting virtual machine access as specified by the associated access data 926, a third application collection 932 may be dynamically installed on the multi-tenant virtual machine instance 912 and a fourth application collection 938 may also be dynamically installed on the multi-tenant virtual machine instance 912.

The virtual machine instance 920 may be a virtual machine instance instantiated from the same virtual machine image that is used to instantiate the virtual machine instance 912. As such, the virtual machine instance 912 and the virtual machine instance 920 may be part of a virtual machine instance group, wherein each of the virtual machine instances in the virtual machine instance group are instantiated from the same virtual machine image. It should be noted that virtual machine instance 920 where the second application collection 918 corresponding to the second set of runtime data 916 of the access data 904 may be a multi-tenant virtual machine instance or may be a single-tenant virtual machine instance. That is, the environment provided by the computing resource service provider may be exclusively a multi-tenant environment, may be exclusively a single-tenant environment, or may be a mixture of multi-tenant and single-tenant environments where the type of virtual machine instance may be chosen based at least in part on the runtime data.

Figure 10:
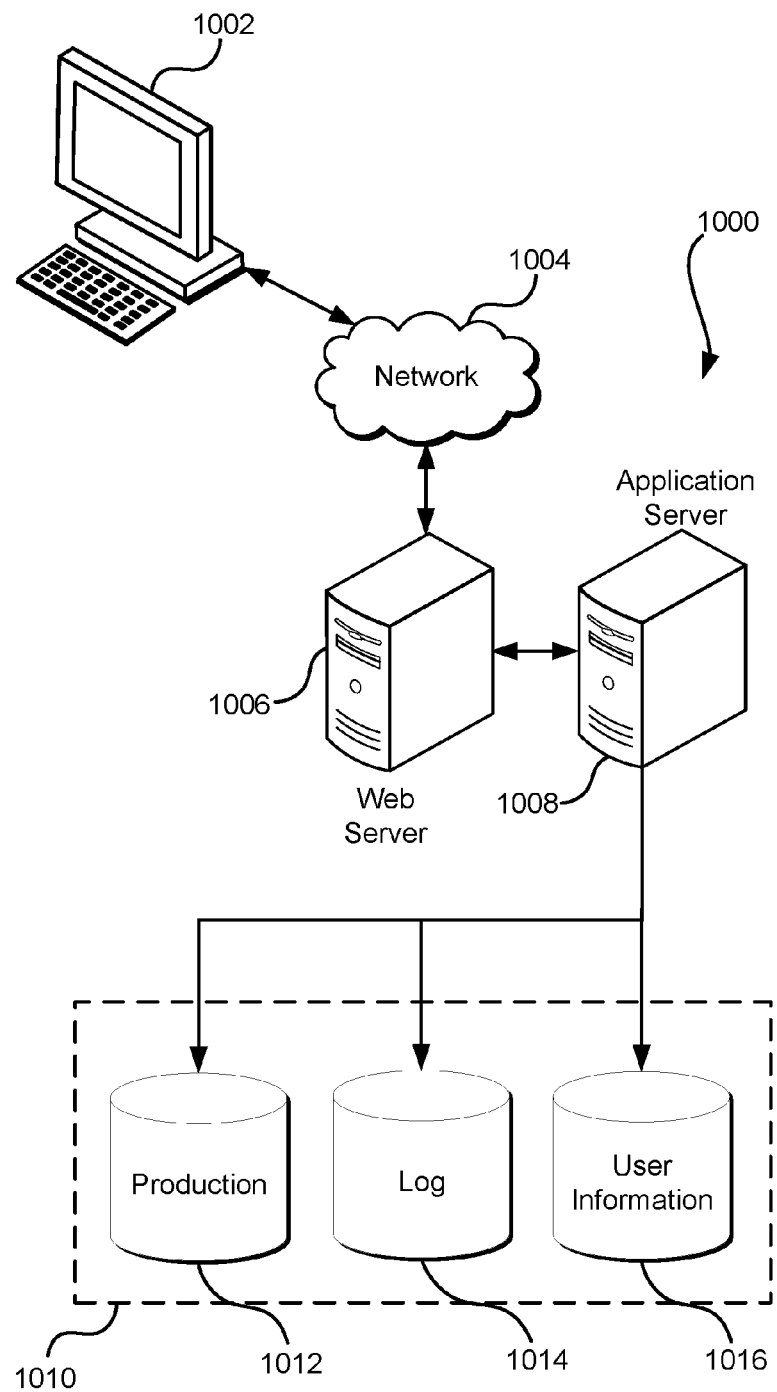
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium, which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
 instantiating a virtual machine instance that replicates display contents of the virtual machine instance to a display of a computing device associated with a user;
 creating a set of virtual machine image metadata based at least in part on a configuration of the virtual machine instance;
 receiving a notification of an input event from the computing device;
 determining, based at least in part on a set of metadata associated with the input event, that the input event is a configuration event;
 extracting a subset of the set of metadata associated from the configuration event;
 updating the set of virtual machine image metadata based at least in part on the subset of the set of metadata;
 configuring the virtual machine instance by performing one or more operations specified by the configuration event;
 generating a virtual machine image from the virtual machine instance; and associating the set of virtual machine image metadata with the virtual machine image.

2. The computer-implemented method of claim 1, wherein the configuration event is associated with an installation of one or more software applications.

3. The computer-implemented method of claim 1, further comprising:
storing the virtual machine image in a virtual machine image catalog.

4. The computer-implemented method of claim 3, further comprising:
determining a selected virtual machine image from the virtual machine image catalog based at least in part on the virtual machine image metadata corresponding to one or more search parameters specified by a user of the virtual machine image catalog; and
instantiating a second virtual machine instance, the second virtual machine instance based at least in part on the selected virtual machine image.

5. A system, comprising:
one or more processors; and
memory storing instructions that, as a result of execution by the one or more processors, cause the system to:
instantiate a virtual machine instance;
receive a notification of a configuration event at the virtual machine instance, the configuration event specifying one or more configuration changes to the virtual machine instance;
extract a set of metadata associated with the configuration event;
create a set of virtual machine image metadata based at least in part on the set of metadata;
configure the virtual machine instance based at least in part on the one or more configuration changes; and
associate the set of virtual machine image metadata with a virtual machine image generated from the virtual machine instance.

6. The system of claim 5, wherein the virtual machine instance replicates display contents of the virtual machine instance to a display of a computing device associated with a user of the virtual machine instance.

7. The system of claim 6, wherein the virtual machine instance replicates the display contents of the virtual machine instance in a browser, the browser displayed on the display of the computing device.

8. The system of claim 6, wherein the virtual machine instance replicates the display contents of the virtual machine instance in a window provided by a client running on the computing device, the window displayed on the display of the computing.

9. The system of claim 5, wherein the virtual machine image generated from the virtual machine instance is generated by copying a set of memory of the virtual machine instance to the virtual machine image.

10. The system of claim 5, wherein the virtual machine image generated from the virtual machine instance is generated after pausing the virtual machine instance.

11. The system of claim 5, wherein the virtual machine image is an application collection, generated from the virtual machine instance by copying a subset of a set of memory of the virtual machine instance to the virtual machine image, the subset selected based at least in part on the one or more configuration changes.

12. The system of claim 11, wherein the application collection is instantiated on a second virtual machine instance, the second virtual machine instance selected based at least in part on the set of metadata.

13. A non-transitory computer-readable storage medium having stored thereon executable instructions that, as a result of being executed by one or more processors of a computer system, cause the computer system to at least:
receive a notification of a configuration event at a virtual machine instance that sends display contents of the virtual machine instance to a display of a computing device, the configuration event specifying one or more configuration changes to the virtual machine instance;
configure the virtual machine instance based at least in part on the one or more configuration changes;
create a set of virtual machine image metadata based at least in part on the one or more configuration changes; and
associate the set of virtual machine image metadata with a virtual machine image generated from the virtual machine instance.

14. The non-transitory computer-readable storage medium of claim 13, wherein one or more of the one or more configuration changes cause an alteration to configuration parameters of the virtual machine instance, the configuration parameters including at least one of: an amount of memory associated with the virtual machine instance, an amount of storage associated with the virtual machine instance, a processor associated with the virtual machine instance, or a network bandwidth associated with the virtual machine instance.

15. The non-transitory computer-readable storage medium of claim 13, wherein one or more of the one or more configuration changes cause an installation of one or more software applications on the virtual machine instance.

16. The non-transitory computer-readable storage medium of claim 15, wherein the virtual machine image generated from the virtual machine instance is an application collection generated based at least in part on the installation of the one or more software applications on the virtual machine instance.

17. The non-transitory computer-readable storage medium of claim 16, wherein the application collection is installed on a second virtual machine instance, the second virtual machine instance selected based at least in part on the set of metadata.

18. The non-transitory computer-readable storage medium of claim 17, wherein the second virtual machine instance is a multi-tenant virtual machine instance that provides one or more application collections to one or more users of the second virtual machine instance.

19. The non-transitory computer-readable storage medium of claim 13, wherein one or more of the one or more configuration changes cause a removal of one or more software applications installed on the virtual machine image.

20. The non-transitory computer-readable storage medium of claim 13, wherein one or more of the one or more configuration changes cause an update of one or more software applications installed on the virtual machine image.

* * * * *